US012277485B2

(12) United States Patent
Ben Arie et al.

(10) Patent No.: US 12,277,485 B2
(45) Date of Patent: Apr. 15, 2025

(54) EFFICIENT REAL TIME SERVING OF ENSEMBLE MODELS

(71) Applicant: Intuit Inc., Mountain View, CA (US)

(72) Inventors: Aviv Ben Arie, Ramat Gan (IL); Omer Zalmanson, Petah Tikva (IL)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 18/102,075

(22) Filed: Jan. 26, 2023

(65) Prior Publication Data

US 2024/0256984 A1    Aug. 1, 2024

(51) Int. Cl.
*G06N 20/20*    (2019.01)

(52) U.S. Cl.
CPC .................. *G06N 20/20* (2019.01)

(58) Field of Classification Search
CPC ........................................... G06N 20/20
See application file for complete search history.

(56) References Cited

U.S. PATENT DOCUMENTS

| | | | |
|---|---|---|---|
| 9,516,053 B1* | 12/2016 | Muddu | G06F 16/9024 |
| 11,636,286 B1* | 4/2023 | Goldenberg | G06V 10/809 |
| | | | 382/157 |
| 2020/0012948 A1* | 1/2020 | Tian | G06N 5/01 |
| 2022/0122000 A1* | 4/2022 | Li | G06F 18/2113 |
| 2022/0318684 A1* | 10/2022 | Allahdadian | G06N 20/20 |

* cited by examiner

*Primary Examiner* — Van C Mang
(74) *Attorney, Agent, or Firm* — Lathrop GPM LLP

(57) ABSTRACT

A method implements efficient real time serving of ensemble models. The method includes receiving an input and processing the input with an abridged model to generate a set of component scores and an abridged score. The method further includes processing the set of component scores with a deviation threshold to select one of the abridged score and an ensemble score as an output and presenting the output.

20 Claims, 4 Drawing Sheets

EFFICIENT REAL TIME SERVING OF ENSEMBLE MODELS

BACKGROUND

Computer implemented models, including machine learning models, are becoming increasingly complex to solve increasingly sophisticated problems while using more and more compute resources. For example, internet traffic may be monitored for problems related to fraudulent activity using increasing amounts of data for each message sent over a network. A challenge is to reduce the compute resources used by computer implemented models while maintaining sufficient levels of accuracy.

SUMMARY

In general, in one or more aspects, the disclosure relates to a method that implements efficient real time serving of ensemble models. The method includes receiving an input and processing the input with an abridged model to generate a set of component scores and an abridged score. The method further includes processing the set of component scores with a deviation threshold to select one of the abridged score and an ensemble score as an output and presenting the output.

In general, in one or more aspects, the disclosure relates to a system that implements efficient real time serving of ensemble models. The system includes an output controller configured to generate an output and an application executing on one or more servers. The application is configured for receiving an input and processing the input with an abridged model to generate a set of component scores and an abridged score. The application is further configured for processing, by the output controller, the set of component scores with a deviation threshold to select one of the abridged score and an ensemble score as an output and presenting the output.

In general, in one or more aspects, the disclosure relates to a computer program product that includes a non-transitory computer-readable program code. When executed by a computer processor of a computing system, the code performs operations that include receiving an input and processing the input with an abridged model to generate a set of component scores and an abridged score. The code performs further operations that include processing, by the output controller, the set of component scores with a deviation threshold to select one of the abridged score and an ensemble score as an output and presenting the output.

Other aspects of the invention will be apparent from the following description and the appended claims.

DETAILED DESCRIPTION

In general, embodiments perform efficient real time serving of ensemble models to reduce the compute resources used by computer implemented models while maintaining sufficient levels of accuracy. Systems may generate an abridged model from a machine learning model and use the abridged model in lieu of the original model when the abridged model maintains sufficient accuracy. For example, an abridged model may be generated by selecting component models from an ensemble model. When the standard deviation of selected component models meets a threshold, the abridged model is used to process inputs. When the standard deviation of selected component models does not meet a threshold, the original ensemble model is used to process inputs. The abridged model, being a subset of the ensemble model, uses fewer compute resources and may generate outputs more quickly than the ensemble model.

In one example, Thanos may be attempting to fraudulently access the computer systems operated by Batman Corporation. The access attempts may be processed in real-time using the abridged model to reject the access attempts of Thanos while still allowing nonfraudulent access by other users.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improvements to the technology of computer implemented models and model execution. The various elements, systems, components, and steps shown in the figures may be omitted, repeated, combined, and/or altered as shown from the figures. Accordingly, the scope of the present disclosure should not be considered limited to the specific arrangements shown in the figures.

Figure 1:
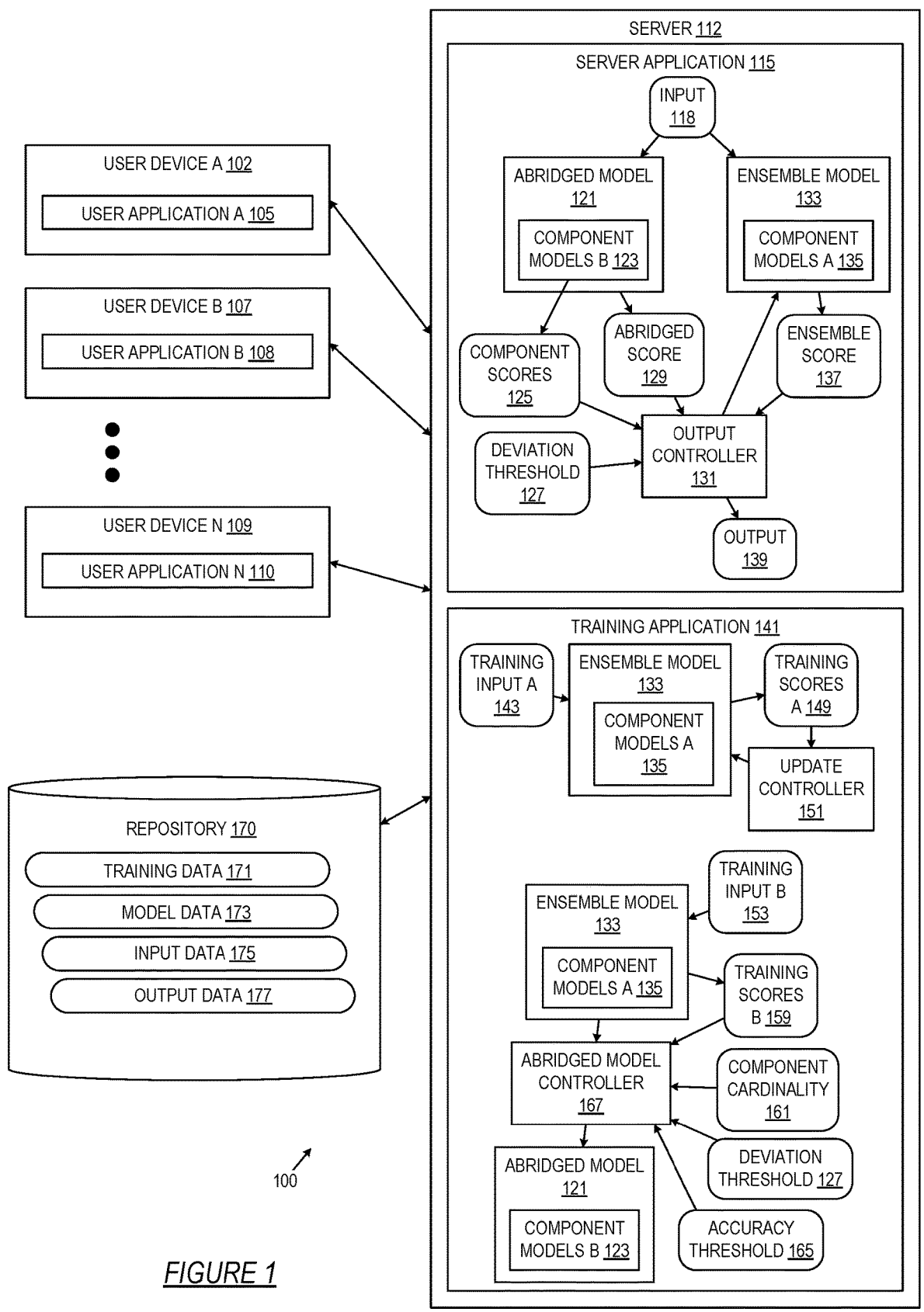
FIG. 1 shows diagrams of systems in accordance with disclosed embodiments.

Turning to FIG. 1, the system (100) performs efficient real time serving of ensemble models. The system (100) processes the input (118) from the user devices A (102) and B (107) through N (109) with the server (112) to generate the output (139). The system (100) includes the server (112), the user devices A (102) and B (107) through N (109), and the repository (170).

Figure 4A:
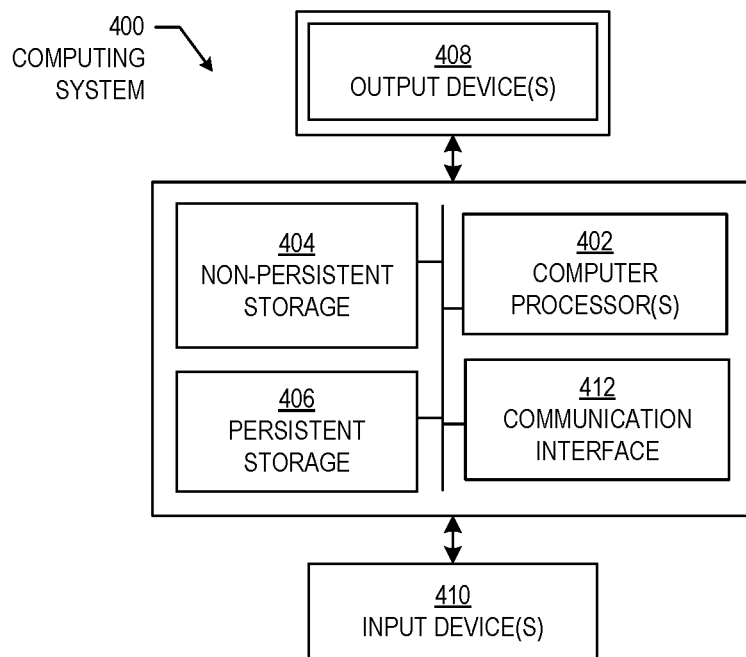
FIG. 4A and FIG. 4B show computing systems in accordance with disclosed embodiments.

The server (112) is a computing system (further described in FIG. 4A). The server (112) may include multiple physical and virtual computing systems that form part of a cloud computing environment. In one embodiment, execution of the instructions, programs, and applications of the server (112) is distributed to multiple physical and virtual computing systems in the cloud computing environment. The server (112) may include the server application (115) and the training application (141).

The server application (115) is a collection of programs with instructions that may execute on multiple servers of a cloud environment, including the server (112). The server application (115) processes the input (118) to generate the abridged score (129) and may generate the ensemble score (137). One of the abridged score (129) and the ensemble score (137) are selected to use for the output (139). In one embodiment, the server application (115) hosts websites and may serve structured documents (hypertext markup language (HTML) pages, extensible markup language (XML) pages, JavaScript object notation (JSON) files and messages, etc.) to interact with the user devices A (102) and B (107) through N (109). Requests from the user devices A (102) and B (107) through N (109) may be processed to generate the input (118) used to generate the output (139). The output (139) may be processed to generate responses that are returned to the user devices A (102) and B (107) through N (109). The server application (115) may include the abridged model (121), the output controller (131), and the ensemble model (133).

The input (118) is data that is input to at least the abridged model (121) and may be input to the ensemble model (133). In one embodiment, the input (118) is generated responsive to interaction with the user devices A (102) and B (107) through N (109). For example, the input (118) may be data generated for requests from the user devices A (102) and B (107) through N (109) to access the system (100) and may include header information from the requests. The data may be stored as rows of tabular data, vectors of data, etc. In one embodiment, the input (118) may include login data, which may include an internet protocol (IP) address, geolocation information, location mismatch information, login attempt information (e.g., a count of the number of logins from the IP address), fraudulent attempt information (e.g., a count of the number of attempts from the IP address identified as fraudulent), time information (month, day, year, hour, minute, second, etc.) etc.

The abridged model (121) is a collection of programs with instructions that may operate on the server (112). The abridged model (121) processes the input (118) to generate the abridged score (129) using the component models B (123). The abridged model (121) may be a subset of the ensemble model (133). The abridged model (121) includes fewer component models than the ensemble model (133). By including fewer models, the abridged model (121) may use fewer compute resources and less computing time to generate the abridged score (129) than is used by the ensemble model (133) to generate the ensemble score (137).

The component models B (123) are collections of programs with instructions that may operate on the server (112). The component models B (123) process the input (118) to generate the component scores (125). The component models B (123) are a subset of the component models A (135) of the ensemble model (133). The cardinality of the component models B (123) is less than the cardinality of the component models A (135). In other words, the component models B (123) includes fewer models than the component models A (135).

The component scores (125) are data generated by the component models B (123). In one embodiment, one of the component scores (125) is generated by one of the component models B (123). The component scores (125) are in the same space and have the same meaning as the abridged score (129) and the ensemble score (137). For example, if the abridged score (129) is a classification of the input (118), then each of the component scores (125) are also classifications of the input (118). The component scores (125) may be aggregated to form the abridged score (129).

The deviation threshold (127) is a threshold that defines an amount of deviation of the component scores (125) used to determine whether the abridged score (129) is used to form the output (139) or the ensemble score (137) is used to form the output (139). In one embodiment, the deviation threshold (127) is a threshold value against which the standard deviation of the component scores (125) is compared in order to determine whether the abridged score (129) or the ensemble score (137) is used to form the output (139). For example, when the standard deviation of the component scores (125) is above the deviation threshold (127) (meaning that there is less than the accepted amount of concurrence between the outputs of the component models B (123)), then the ensemble score (137) may be used instead of the abridged score (129) to form the output (139).

The abridged score (129) is data generated by the abridged model (121) from the input (118). In one embodiment, the abridged score (129) is generated by aggregating the component scores (125). The method of aggregation used to generate the abridged score (129) may be the same as the method of aggregation used to generate the ensemble score (137) from the outputs of the component models A (135).

The output controller (131) is a collection of programs with instructions that may operate on the server (112). The output controller (131) generates the output (139) using the component scores (125), the deviation threshold (127), and the abridged score (129). The output controller (131) may also use the ensemble score (137) to generate the output (139). For example, the output controller (131) may compare the standard deviation of the component scores (125) to the deviation threshold (127) to determine whether to use the abridged score (129) to form the output (139). When the output controller (131) does not use the abridged score (129), the output controller (131) may trigger generation of the ensemble score (137) by the ensemble model (133) and use the ensemble score (137) to form the output (139).

The ensemble model (133) is a collection of programs with instructions that may operate on the server (112). In one embodiment, the ensemble model (133) is a random forest model that includes multiple tree models (e.g., the component models A (135)) in which the outputs of the multiple tree models are aggregated to form an output (e.g., the ensemble score (137)). The ensemble model (133) uses the component models A (135) to process the input (118) and generate the ensemble score (137).

The component models A (135) are collections of programs with instructions that may operate on the server (112). The component models A (135) are the models that combine to form the ensemble model (133). The component models A (135) process the input (118) to generate outputs that are aggregated to form the ensemble score (137). In one embodiment, the aggregation method may include averaging, weighted averaging, etc.

The ensemble score (137) is data generated by the abridged model (121) from the input (118). The ensemble score (137) is generated by aggregating the outputs from the component models A (135). In one embodiment, the ensemble score (137) is generated after determining that the standard deviation of the component scores (125) does not satisfy the deviation threshold (127).

The output (139) is the data generated by the server application (115) in response to the input (118). In one embodiment, the output (139) identifies if the request from which the input (118) was generated is a fraudulent request. In one embodiment, the output (139) is one of the abridged score (129) and the ensemble score (137).

The training application (141) is a collection of programs with instructions that may execute on multiple servers of a cloud environment, including the server (112). The training application (141) trains the ensemble model (133) using the update controller (151) and generates the abridged model (121) using the abridged model controller.

The training input A (143) is the input used to train the ensemble model (133). The training input A (143) may be a subset of the training data (171). The training input A (143) may include vectors comprising login data from previous attempts to login to the system (100). The vectors may be labeled as fraudulent or non-fraudulent.

The ensemble model (133) is the computational model being trained. The ensemble model (133) is used by the server application (115) to generate the scores (125). The ensemble model (133) processes the training input A (143) to generate the training scores A (149).

The training scores A (149) are the outputs of the ensemble model (133). In one embodiment, one training score may be generated for each training input.

The update controller (151) updates the ensemble model (133). In one embodiment, the update controller (151) processes the training scores A (149) to generate updates for the ensemble model (133). One or more algorithms may be used by the update controller (151). In one embodiment, the ensemble model (133) is a random forest model, and the update controller (151) grows the trees (e.g., the component models A (135)) based on the training scores A (149).

The training input B (153) is the input used to generate the abridged model (121) from the ensemble model (133). The training input B (153) may be a subset of the training data (171) that was not used to train the ensemble model (133). The training input B (153) may be unlabeled.

The ensemble model (133) is the model that has been trained by the update controller (151). The ensemble model (133) processes the training input B (153) using the component models A (135) to generate the training scores B (159).

The component models A (135) are the component models that have been trained by the update controller (151). The component models A (135) process the training input B (153) to generate outputs that are aggregated to form the training scores B (159).

The training scores B (159) are the outputs of the ensemble model (133). In one embodiment, one training score may be generated for each training input. In one embodiment, the training scores B (159) are used as labels for the training input B (153) to determine the accuracy of the abridged model (121).

The component cardinality (161) is a value that identifies the cardinality of the abridged model (121). The cardinality of the abridged model (121) identifies the number of the component models B (123) that are used to form the abridged model (121). In one embodiment, the component cardinality (161) may be a natural number from 1 to n. In one embodiment, the user may select the maximum value to which the component cardinality (161) may be set.

The deviation threshold (127) is a threshold value that identifies the amount deviation between the outputs of the component models B (123) for using the output of the abridged model (121) (instead of the output of the ensemble model (133)) for a given input. As described above, the deviation threshold (127) may be a standard deviation value to which the standard deviation of the outputs of the component models B (123) is compared. In one embodiment, the deviation threshold (127) may be a natural number from 1 to m. In one embodiment, the user may select the maximum value to which the component cardinality (161) may be set.

The accuracy threshold (165) is a threshold value that identifies an amount of accuracy the abridged model (121) is to achieve before being used in lieu of the ensemble model (133). For example, with an accuracy threshold of 0.9 (other values may be used), the outputs of the abridged model (121) concur with the outputs of the ensemble model (133) for at least 90% of the training inputs B (which include the training input B (153)) used to generate the abridged model (121).

The abridged model controller (167) is a collection of programs with instructions that may operate on the server (112). The abridged model controller (167) generates the abridged model (121) from the ensemble model (133) and may tune the component cardinality (161) and the deviation threshold (127) using the accuracy threshold (165). For example, the abridged model controller (167) may select a minimum value for the component cardinality (161) and a maximum value for the deviation threshold (127) for which the abridged model (121) achieves the accuracy threshold (165).

The abridged model (121) is the model generated from the ensemble model (133) by the abridged model controller (167). The abridged model (121) includes the component models B (123).

The component models B (123) are the component models of the abridged model (121). In one embodiment, the component models B (123) are fewer in number than the component models A (135). In one embodiment, the component models B (123) are the highest ranked models from the component models A (135) based on accuracy of the output of the component models A (135) to the output of the ensemble model (133).

Continuing with FIG. 1, the user devices A (102) and B (107) through N (109) are computing systems (further described in FIG. 4A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access, manipulate, and view services and information hosted by the system (100). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server (112).

As an example, the user application A (105) may be used to send a login request to the server (112) from which the input (118) is generated. The input (118) is processed by the system (100) to generate the output (139) from which a response to the login request may be transmitted to the user application A (105). The output (139) and the response may be presented to and displayed by the user application A (105).

Figure 4B:
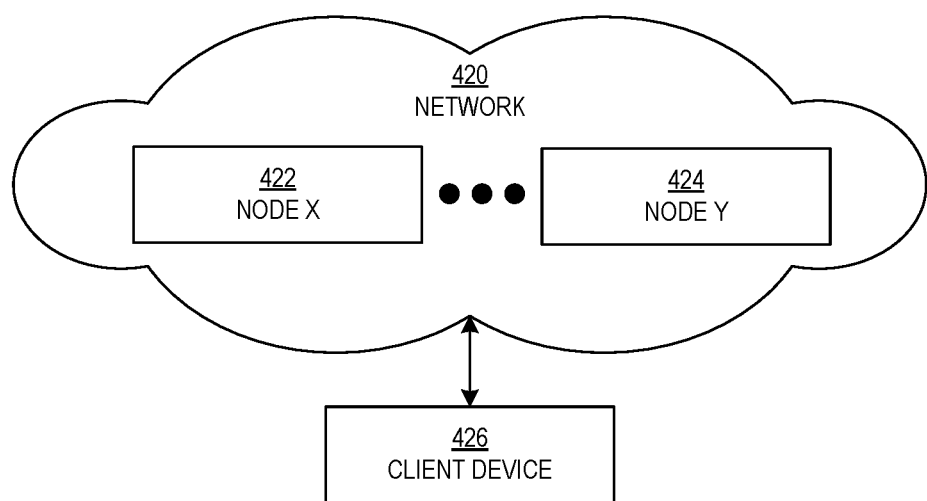

The repository (170) is a computing system that may include multiple computing devices in accordance with the computing system (400) and the nodes (422) and (424) described below in FIGS. 4A and 4B. The repository (170) may be hosted by a cloud services provider that also hosts the server (112). The cloud services provider may provide hosting, virtualization, and data storage services as well as other cloud services to operate and control the data, programs, and applications that store and retrieve data from the repository (170). The data in the repository (170) includes the training data (171), the model data (173), the input data (175), and the output data (177).

The training data (171) is data used to train the ensemble model (133) and generate the abridged model (121). In one embodiment, the training data (171) includes the training scores A (149) and the training scores B (159). In one embodiment, the training data (171) includes historical request and the inputs generated from the requests that are used to improve the ensemble model (133) and the abridged model (121).

The model data (173) is data that defines the ensemble model (133) and the abridged model (121). The model data (173) may include parameters, weights, hyperparameters, etc.

The input data (175) is real time data generated by the system (100) in response to requests from the user devices A (102) and B (107) through N (109). The input data (175) may be captured and stored in the training data (171) to train the ensemble model (133) and the abridged model (121).

The output data (177) is the real time output generated from the input data (175). In one embodiment, the output data (177) is mapped to messages that are transmitted to the user devices A (102) and B (107) through N (109).

Although shown using distributed computing architectures and systems, other architectures and systems may be used. In one embodiment, the server application (115) may be part of a monolithic application that implements the modeling and management of affinity networks. In one embodiment, the user applications A (105) and B (108) through N (110) may be part of monolithic applications that implement and use ensemble and abridged models without the server application (115).

Figure 2:
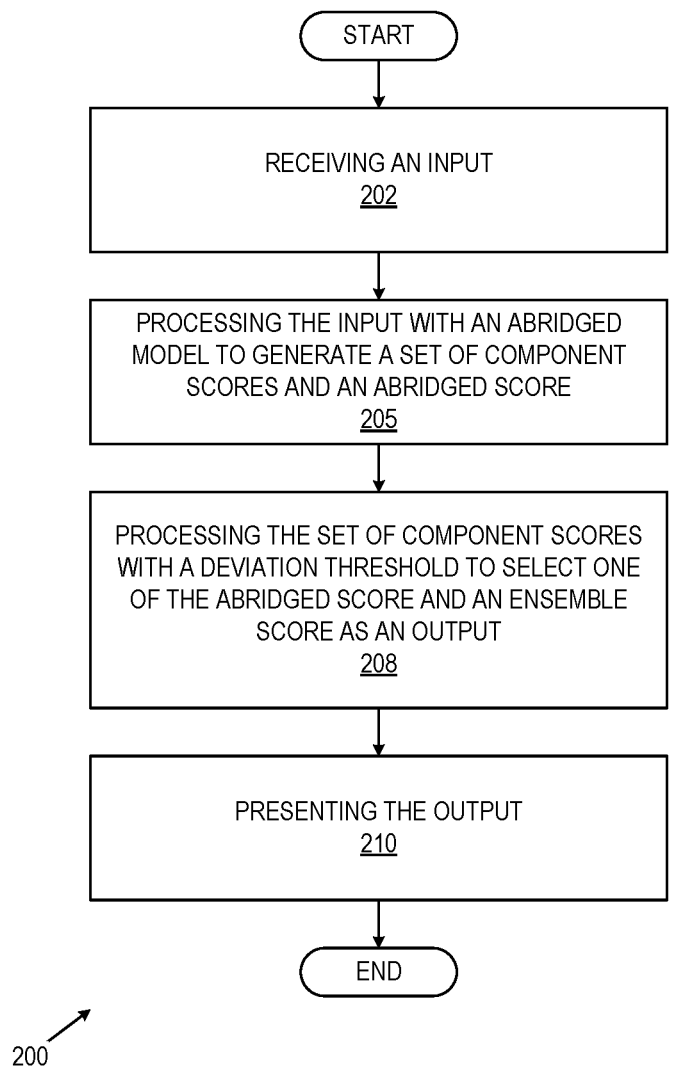
FIG. 2 shows a flowchart in accordance with disclosed embodiments.

Turning to FIG. 2, the process (200) provides efficient real time serving of ensemble models. The process (200) may be performed by a computing device interacting with one or more additional computing devices. For example, the process (200) may execute on a server response to one or more user devices.

At Step 202, an input is received. In one embodiment, the input may include login data. The login data may include an internet protocol (IP) address, geolocation information, location mismatch information, information about login attempts from IP addresses, information about fraudulent attempts from IP addresses, time of day information, etc. In one embodiment, the input is extracted from a request received from a user device. In one embodiment, the request is a login request to access a computer system.

In one embodiment, multiple abridged models are served that consume fewer compute resources than a number of ensemble models to respond to a plurality of requests. For example, the abridged models may use fewer processors, memory, processing time, etc., to process the same number of inputs as an equivalent number of ensemble models.

At Step 205, the input is processed with an abridged model to generate a set of component scores and an abridged score. In one embodiment, the abridged model may include a set of "k" component models in which "k" identifies the number of component models forming the abridged model. In one embodiment, the set of component models are selected from a larger set of component models that form an ensemble model. In one embodiment, the set of component scores are generated by the set of component models.

In one embodiment, the abridged score is an aggregation of the set of component scores. For example, the method of aggregation used may be performed using an average, a probability, a random value selected using a probability, etc. The aggregation method used to combine the scores from the set of component models may be the same aggregation method used by the ensemble model to aggregate scores from the larger set of component models that make up the ensemble model.

In one embodiment, training data is processed with the ensemble model to update the ensemble model. An iterative process may be used. For example, training inputs may be input to the ensemble model to generate training outputs, which are then used to update the parameters of the ensemble model. In one embodiment, the ensemble model is a random forest model and the iterative updates are used to grow the decision trees that make up the random forest model.

In one embodiment, the ensemble model and the larger set of component models for the ensemble model are scored with non-training data to log a plurality of training scores. The non-training data is data that was not used to train the ensemble model but is used to generate the abridged model from the ensemble model. In one embodiment, the training scores correspond to the larger set of component models for the ensemble model.

In one embodiment, the set of component models for the abridged model are selected from the component models for the ensemble model. The selection may use a component cardinality of the set of component models, a deviation threshold, an accuracy threshold, and the plurality of training scores generated for the component models of the ensemble model.

In one embodiment, the component cardinality is a parameter "k" that is selected as the lowest number of models to satisfy the accuracy threshold. In one embodiment, the deviation threshold is the parameter "s" that is selected as the highest standard deviation to satisfy the accuracy threshold. The parameter "s" is compared to the standard deviation of the outputs of the component models for the abridged model. In one embodiment, the accuracy threshold is accuracy of the abridged score for the set of component models (of the abridged model. As an example, the system may test multiple abridged models corresponding to different values for "k" (the number of component models used to form the abridged model) and "s" (the standard deviation threshold to which the outputs of the component models of the abridged model are compared) to identify an abridged model that satisfies the accuracy threshold.

In one embodiment, the training scores generated by the component models are used to rank the individual component models. After ranking the component models, the system selects the "k" number of component models with the highest rank (e.g., the highest accuracy) to create an abridged model. Multiple abridged models are generated with each having different "k" values (i.e., different numbers of component models) and tested using different "s" values (i.e., different standard deviation thresholds. The abridged model that satisfies the accuracy threshold with the lowest "k" and the highest "s" is selected as the abridged model for the ensemble model.

In one embodiment, the component cardinality and the deviation threshold are tuned meet the accuracy threshold. After the ensemble model is trained, multiple abridged models are identified using different "k" values and tested using different "s" values for each of the multiple abridged models. The abridged model that satisfies the accuracy threshold with the lowest "k" and the highest "s" is selected as the abridged model to be used in lieu of the ensemble model when the standard deviation of the outputs of the component models of the abridged model satisfies the deviation threshold (i.e., the "s" value).

In one embodiment, the set of scores (generated by the component models of the abridged model) is aggregated to generate the abridged score. The aggregation method may use one or more of an average, a weighted average, a sum, a weighted sum, etc. In one embodiment, the aggregation method used to aggregate the outputs of the component models of the abridged model may be the same as the aggregation method used for the ensemble model.

At Step 208, the set of component scores (of the component models of the abridged model) are processed with a deviation threshold to select one of the abridged score and an ensemble score as the output for the input. For example, when the standard deviation of the set of component scores (of the component models of the abridged model) is below the deviation threshold ("s"), then the abridged score is used as the output. Otherwise, the ensemble score may be used as the output.

In one embodiment, the abridged score is selected prior to generating the model score. For example, the system may receive an input, instantiate an abridged model (that has already been tuned), generate an abridged score using the input and the abridged model, and test the standard deviation of the scores for the component models of the abridged model against the deviation threshold. In one embodiment, if the standard deviation (of the scores for the component models of the abridged model) is less than or equal to the deviation threshold, then the abridged score is used. Otherwise, the system instantiates an ensemble model (already trained and used as the basis for the abridged model) and generates an ensemble score using the input and the ensemble model. The ensemble score is then used as the output for the input received by the system.

In one embodiment, the set of component scores are processed with the deviation threshold using a standard deviation. For example, the system may compare the standard deviation of the set of scores (generated by the component models of the abridged model) to the deviation threshold.

At Step 210, the output is presented. In one embodiment, the output may be mapped to a message. The message may be transmitted as a response to the device that transmitted the request from which the input was extracted. The message may be displayed by the device that received the message and may include the output in the display of the message. In one embodiment, the output may be presented by sending a message that a login attempt was unsuccessful.

Figure 3:
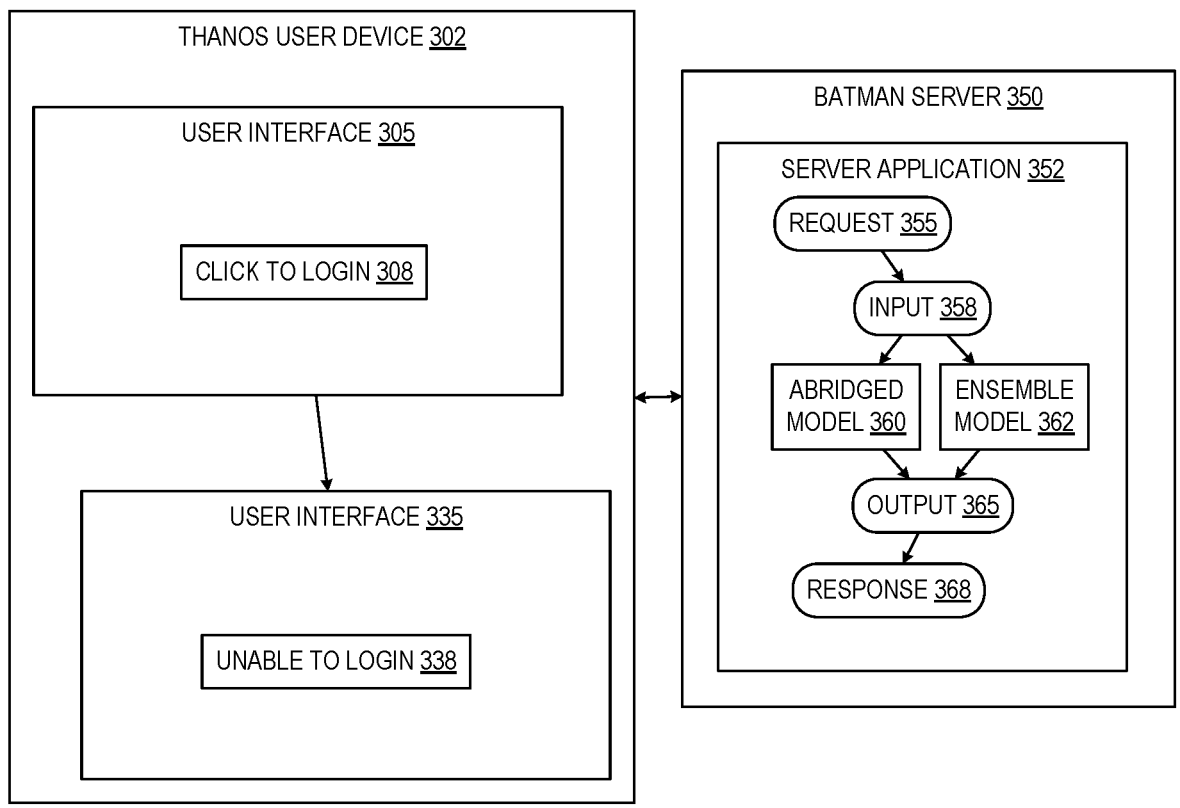
FIG. 3 shows examples in accordance with disclosed embodiments.

Turning to FIG. 3, the system (300) processes login requests. In his quest to delete half of all files from all computers, Thanos attempts to login to the Batman server (350) using the Thanos user device (302). The Thanos user device (302) loads a login page from the Batman server (350) and displays the login page on the user interface (305).

The user interface (305) includes the button (308) to perform the login process for the Batman server (350). Thanos presses the button (308) to enter login information and send a login request to the Batman server (350).

The Batman server (350) receives the login request from the Thanos user device (302) as the request (355) along with thousands to millions of other requests being handled by the Batman server (350). The request (355) is handled by the server application (352) executing on the Batman server (350).

The server application (352) processes the request (355) to extract the input (358). The input (358) is first processed by the abridged model (360) to generate an abridged score and component model scores. In one embodiment, if the standard deviation of the component models scores is less than a deviation threshold, then abridged score of the abridged model (360) is used as the output (365). If the standard deviation of the component models scores is not less than the deviation threshold, then the input (358) is sent to the ensemble model (362) to generate an ensemble score, which may be used as the output (365). For the request (355), the abridged score from the abridged model (360) is used as the output (365).

The output (365) is processed by the server application (352) to generate the response (368). In one embodiment, the output (365) is mapped to a message that is included in the response (368), which is transmitted back to the Thanos user device (302).

The Thanos user device (302) receives the response (368) and displays the message (338), which was included in the response (368). The message (338) indicates that Thanos has been thwarted yet again and Thanos ponders the merits of ridding the universe of half of the data stored on computers.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404), persistent storage (406), a communication interface (412) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) may be one or more cores or micro-cores of a processor. The computer processor(s) (402) includes one or more processors. The one or more processors may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (408). The inputs may include text input, audio input, video input, etc., which may be processed and transmitted by the computing system (400) in accordance with the disclosure. The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the output device(s) (408) may include a display device, a printer, external storage, or any other output device. One or more of the output devices may be the same or different from the input device(s). The input and output device(s) may be locally or remotely connected to the computer processor(s) (402). Many different types of computing systems exist, and the aforementioned input and output device(s) may take other forms. The output device(s) (408) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a computer program product that includes a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422), node Y (424)) in the network (420) may be configured to provide services for a client device (426), including receiving requests and transmitting responses to the client device (426). For example, the nodes may be part of a cloud computing system. The client device (426) may be a computing system, such as the computing system shown in FIG. 4A. Further, the client device (426) may include and/or perform all or a portion of one or more embodiments of the invention.

The computing system of FIG. 4A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A computer implemented method, comprising:
training an ensemble model using a set of training data to generate a trained ensemble model, wherein the trained ensemble model comprises a plurality of component models;
processing, by the trained ensemble model, a set of non-training data to generate a first set of output, wherein the plurality of component models processes the set of non-training data to generate a plurality of component scores for the plurality of component models, and wherein the first set of output is generated from the plurality of component scores, wherein the trained ensemble model executes in a first computing time being an aggregate of executing each of the plurality of component models;
creating an abridged model comprising a set of component models that is a portion of the plurality of component models, wherein the abridged model executes in a second computing time that is less than the first computing time based on executing only the portion of the plurality of component models, wherein creating the abridged model comprises:
testing each subset of a plurality of subsets of the plurality of component models, wherein testing a subset comprises:
determining, for the subset, a deviation between a first set of component scores of the set of component models, and
calculating, for the subset, an accuracy of the subset from the first set of component scores of the subset,
ranking the plurality of subsets of the component models based on the deviation and according to having the accuracy satisfying an accuracy threshold, and
selecting the portion of the plurality of component models for the abridged model using the ranking, wherein the first set of component scores is in the plurality of component scores;
receiving an input;
processing the input by the abridged model to generate a second set of component scores for the set of component models and an abridged score for the abridged model,
wherein the abridged score is an aggregation of the second set of component scores;
processing the second set of component scores to determine a standard deviation of the second set of component scores;
comparing the standard deviation of the second set of component scores with a deviation threshold to select one of the abridged score and an ensemble score of the ensemble model as an output; and presenting the output.

2. The method of claim 1, further comprising:
selecting the abridged score without generating the ensemble score.

3. The method of claim 1, further comprising:
serving a plurality of abridged models, comprising the abridged model, consuming fewer compute resources than a plurality of ensemble models, comprising the ensemble model, to respond to a plurality of requests.

4. The method of claim 1, further comprising:
receiving the input, wherein the input comprises login data.

5. The method of claim 1, further comprising:
processing the input, wherein training the ensemble model comprises:
processing the set of training data with the ensemble model to update the ensemble model;
scoring the ensemble model and the plurality of component models with the set of non-training data to log a plurality of training scores,
wherein the plurality of training scores corresponds to the plurality of component models; and
selecting the set of component models from the plurality of component models using a component cardinality of the set of component models, the deviation threshold, the accuracy threshold, and the plurality of training scores.

6. The method of claim 1, further comprising:
selecting the set of component models from the plurality of component models to form the abridged model by:
tuning a component cardinality and the deviation threshold to meet the accuracy threshold.

7. The method of claim 1, further comprising:
aggregating the second set of component scores to generate the abridged score using one or more of an average, a weighted average, a sum, a weighted sum.

8. The method of claim 1, further comprising:
processing the second set of component scores with the deviation threshold by comparing the standard deviation of the second set of component scores to the deviation threshold.

9. The method of claim 1, further comprising:
presenting the output by sending a message that a login attempt was unsuccessful.

10. A system comprising:
an output controller configured to generate an output;
an application executing on one or more servers and configured for:
training an ensemble model using a set of training data to generate a trained ensemble model, wherein the trained ensemble model comprises a plurality of component models;
processing, by the trained ensemble model, a set of non-training data to generate a first set of output, wherein the plurality of component models processes the set of non-training data to generate a plurality of component scores for the plurality of component models, and wherein the first set of output is generated from the plurality of component scores, wherein the trained ensemble model executes in a first computing time being an aggregate of executing each of the plurality of component models;
creating an abridged model comprising a set of component models that is a portion of the plurality of component models, wherein the abridged model executes in a second computing time that is less than the first computing time based on executing only the portion of the plurality of component models, wherein creating the abridged model comprises:
testing each subset of a plurality of subsets of the plurality of component models, wherein testing a subset comprises:
determining, for the subset, a deviation between a first set of component scores of the set of component models, and
calculating, for the subset, an accuracy of the subset from the first set of component scores of the subset,
ranking the plurality of subsets of the component models based on the deviation and according to having the accuracy satisfying an accuracy threshold, and
selecting the portion of the plurality of component models for the abridged model using the ranking,
wherein the first set of component scores is in the plurality of component scores;
receiving an input;
processing the input by the abridged model to generate a second set of component scores for the set of component models and an abridged score for the abridged model, and wherein the abridged score is an aggregation of the second set of component scores;
processing, by the output controller, the second set of component scores to determine a standard deviation of the second set of component scores;
comparing the standard deviation of the second set of component scores with a deviation threshold to select one of the abridged score and an ensemble score of the ensemble model as the output; and
presenting the output.

11. The system of claim 10, wherein the application is further configured for:
selecting the abridged score without generating the ensemble score.

12. The system of claim 10, wherein the application is further configured for:
serving a plurality of abridged models, comprising the abridged model, consuming fewer compute resources than a plurality of ensemble models, comprising the ensemble model, to respond to a plurality of requests.

13. The system of claim 10, wherein the application is further configured for:
receiving the input, wherein the input comprises login data.

14. The system of claim 10, wherein the application is further configured for:
processing the input, wherein training the ensemble model comprises:
processing the set of training data with the ensemble model to update the ensemble model;
scoring the ensemble model and the plurality of component models with the set of non-training data to log a plurality of training scores, wherein the plurality of training scores corresponds to the plurality of component models; and
selecting the set of component models from the plurality of component models using a component cardinality of the set of component models, the deviation threshold, the accuracy threshold, and the plurality of training scores.

15. The system of claim 10, wherein the application is further configured for:

selecting the set of component models from the plurality of component models to form the abridged model by:
tuning a component cardinality and the deviation threshold to meet the accuracy threshold.

16. The system of claim 10, wherein the application is further configured for:
aggregating the second set of component scores to generate the abridged score using one or more of an average, a weighted average, a sum, a weighted sum.

17. The system of claim 10, wherein the application is further configured for:
processing the second set of component scores with the deviation threshold by comparing the standard deviation of the second set of component scores to the deviation threshold.

18. The system of claim 10, wherein the application is further configured for:
presenting the output by sending a message that a login attempt was unsuccessful.

19. A non-transitory computer program product comprising computer-readable program code that, when executed by a computer processor of a computing system, causes the computing system to perform operations comprising:
training an ensemble model using a set of training data to generate a trained ensemble model, wherein the trained ensemble model comprises a plurality of component models;
processing, by the trained ensemble model, a set of non-training data to generate a first set of output, wherein the plurality of component models processes the set of non-training data to generate a plurality of component scores for the plurality of component models, and wherein the first set of output is generated from the plurality of component scores, wherein the trained ensemble model executes in a first computing time being an aggregate of executing each of the plurality of component models;
creating an abridged model comprising a set of component models that is a portion of the plurality of component models, wherein the abridged model executes in a second computing time that is less than the first computing time based on executing only the portion of the plurality of component models, wherein creating the abridged model comprises:
testing each subset of a plurality of subsets of the plurality of component models, wherein testing a subset comprises:
determining, for the subset, a deviation between a first set of component scores of the set of component models, and
calculating, for the subset, an accuracy of the subset from the first set of component scores of the subset,
ranking the plurality of subsets of the component models based on the deviation and according to having the accuracy satisfying an accuracy threshold, and
selecting the portion of the plurality of component models for the abridged model using the ranking,
wherein the first set of component scores is in the plurality of component scores;
receiving an input;
processing the input by the abridged model to generate a second set of component scores for the set of component models and an abridged score for the abridged model, wherein the abridged score is an aggregation of the second set of component scores;
processing the second set of component scores to determine a standard deviation of the second set of component scores;
comparing the standard deviation of the second set of component scores with a deviation threshold to select one of the abridged score and an ensemble score of the ensemble model as an output; and
presenting the output.

20. The non-transitory computer program product of claim 19, wherein the computer-readable program code further causes the computing system to perform operations comprising:
selecting the abridged score without generating the ensemble score.

* * * * *